C. F. KETTERING.
STORE SERVICE CREDIT SYSTEM APPARATUS.
APPLICATION FILED DEC. 7, 1906.

1,122,605.

Patented Dec. 29, 1914.

3 SHEETS—SHEET 1.

FIG. 1.

Witnesses

Inventor
Charles F. Kettering
by J. B. Hayward
and R. C. Glass
Attorneys

C. F. KETTERING.
STORE SERVICE CREDIT SYSTEM APPARATUS.
APPLICATION FILED DEC. 7, 1906.
1,122,605.
Patented Dec. 29, 1914.
3 SHEETS—SHEET 2.
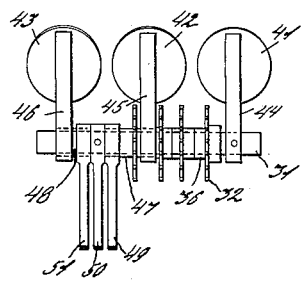
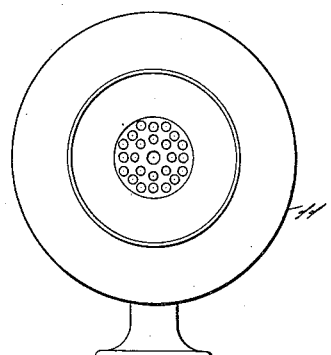
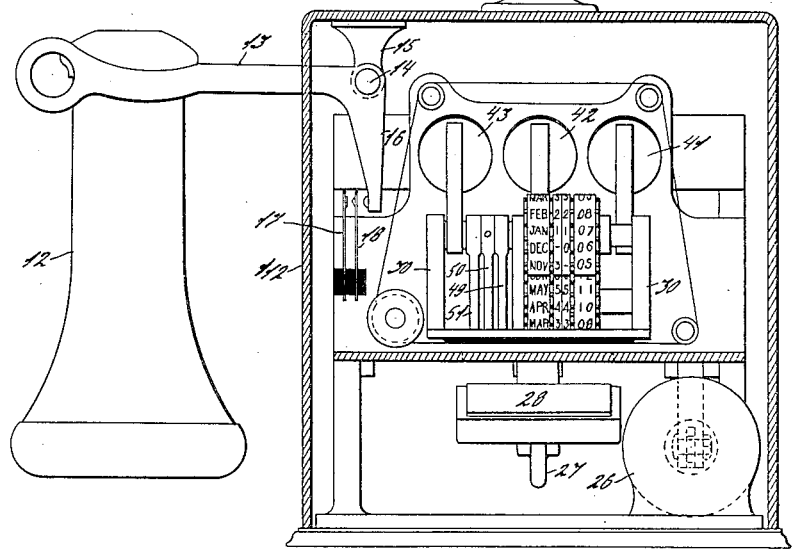

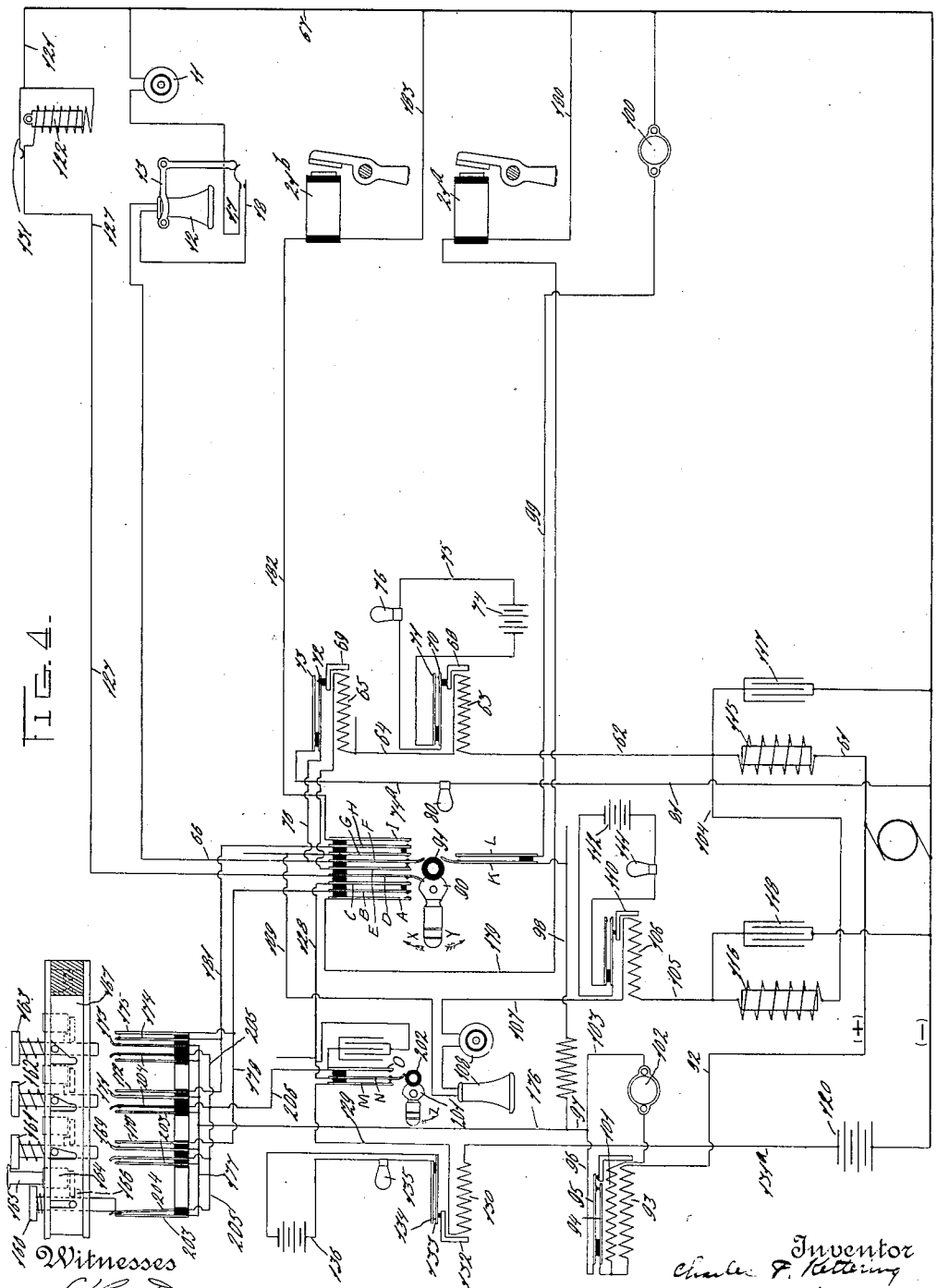

UNITED STATES PATENT OFFICE.

CHARLES F. KETTERING, OF DAYTON, OHIO, ASSIGNOR TO THE NATIONAL CASH REGISTER COMPANY, OF DAYTON, OHIO, A CORPORATION OF OHIO, (INCORPORATED IN 1906.)

STORE-SERVICE CREDIT-SYSTEM APPARATUS.

1,122,605. Specification of Letters Patent. Patented Dec. 29, 1914.

Application filed December 7, 1906. Serial No. 346,794.

*To all whom it may concern:*

Be it known that I, CHARLES F. KETTERING, a citizen of the United States, residing at Dayton, in the county of Montgomery and State of Ohio, have invented certain new and useful Improvements in Store-Service Credit-System Apparatus, of which I declare the following to be a full, clear, and exact description.

This invention relates to store service systems, and has for its main object to provide mechanism for assisting in the authorization of credit sales. In many commercial houses the problem of compelling sales people to secure proper authorization before making a sale on credit is a very important one. It is obviously unsafe in most cases to trust the judgment of the clerk as to whether credit should be allowed, and to compel a message being sent to some credit man who is authorized to allow credit is a lengthly and tedious proceeding. In many cases an improvement has been made by using a telephone, over which the credit man is communicated with; but even in such cases there is nothing to show that the credit man really authorized any particular transaction, and it must depend ultimately upon the word of the clerk. The invention is designed, therefore, to obviate this difficulty by providing a means for making a permanent record on sales slips authorizing credit in a particular case, and so arranging the devices that the means can only be operated by the credit man and not by the clerk. In particular an electrically-operated device is provided to stamp an inserted sales slip, and electrical connections to the credit man's desk are also provided with means for controlling the stamping device from that point.

The invention also includes an identifying or designating mechanism for the credit man so that the stamp cannot be operated without a previous setting of the said identifying or designating devices. This serves to determine which of a plurality of credit men authorized any particular transaction.

With these and incidental objects in view the invention consists in certain novel features of construction and combination of parts, the essential elements of which are set forth in appended claims and a preferred form of embodiment of which is hereinafter described with reference to the drawings which accompany and form part of this specification.

Of said drawings: Figure 1 is a side elevation of the stamping device, the casing and supporting frame being shown in section. Fig. 2 is a front elevation of the stamping device with parts sectioned as in Fig. 1. Fig. 3 is a detail of the identifying devices and setting magnets therefor. Fig. 4 is a diagram of the electrical circuits of the apparatus.

In prior applications Serial No. 236,893, filed Dec. 14, 1904, and Serial No. 301,707 filed Feb. 17, 1906, a system of the same general type as that disclosed in this invention is provided and the present invention is designed as an improvement on said prior applications.

Described in general terms the invention contemplates the use of a telephone line from the clerk's station to the position occupied by the credit man. This provides for communication of the customer's name and the amount of the sale or any other desired information to the credit man. If he is willing to authorize the sale a push button or its equivalent operated by the credit man serves to cause the operation of the stamping device at the clerk's station, which stamping device is arranged to stamp a sales slip or other memorandum of the sale. In the circuits for the stamping device are arranged switches which are controlled by identifying or designating keys so that one of said keys must be operated before the stamping circuit is completed. Also closed by said keys are circuits passing through identifying or designating magnets in the distant stamping device which serve to cause the adjustment of identifying or designating type carriers depending on the key operated, whereby a permanent record of the particular credit man authorizing the sale is made on the sales slip. Devices to prevent operation of the stamp except when the record material or article to be marked has been inserted in said stamp are provided whereby the credit man can tell whether or not an article to be marked has been so inserted. If attempt is made to operate the stamp in spite of the warning, means are provided for throwing additional resistance into the circuit and thereby preventing such misoperation.

The stamping device at the clerk's station is shown in Figs. 1, 2 and 3 and comprises an ordinary telephone set consisting of a transmitter 11 and a receiver 12 which may be of any well known or usual type. The transmitter and receiver are for convenience mounted on the casing 112 of the stamping device but if desired the telephone instrument may be entirely separate and in fact the ordinary desk telephone set may be used. The receiver hook 13 is pivoted at 14 on a bracket 15 supported by the casing 112 and is provided with the usual arm 16 serving to close contacts 17 and 18 when the receiver is removed from the hook. A bracket 20 is provided in the casing 112 and supports at the top thereof a plurality of magnets 21 and a shaft 22 on which is mounted a crank arm 23 connected at 24 to the core 25 of a solenoid 26. Also carried by and movable with shaft 22 is a platen arm 27 carrying a platen 28. It will be clear that when the coil of the solenoid 26 is energized the platen arm 27 and platen 28 will be raised to take an impression. Also carried by said bracket 20 is a frame 29 on which are mounted standards 30 supporting a shaft 31. This shaft 31 supports a plurality of operating devices for type carriers, among whom are a plurality of gears 32 shown in Figs. 1 and 3 operating dating type wheels 33. The gears 32 mesh also with gears 34 carrying indicating disks 35 projecting through an opening in the casing so that the said indicating disks 35 may be manually adjusted. These disks 35 clearly serve to set the dating type wheels 33. It will be clear from Fig. 3 that gears 32 are mounted on collars 36 loose on shaft 31, these collars preventing any sliding of the gears 32 on the shaft. A series of yielding detents 37 are provided to prevent accidental movement of the train and all detents 37 are spring pressed to latching position by springs 38, pressing against said detents and against lugs formed on a stationary part of the frame. The magnets 21 are three in number and are provided with armatures shown in Figs. 1, 2 and 3 and indicated by numerals 41, 42 and 43. These armatures are carried by arms 44, 45 and 46, arm 44 being rigidly carried on shaft 31, while arm 45 is rigid on a sleeve 47 and arm 46 is likewise rigid on a sleeve 48, both said sleeves being loose on shaft 31. Depending from and supported by the shaft 31 are three type carries 49, 50 and 51. Carrier 49 is rigidly carried on sleeve 47, carrier 50 is tight on shaft 31 and carrier 51 is rigid with sleeve 48. From this construction it will be clear that when the armature 41 is energized type carrier 50 will be moved, when armature 42 is attracted carrier 49 will be adjusted and when armature 43 is moved carrier 51 will also move. As shown in Fig. 1 each of the type carriers 49, 50 and 51 has at the bottom thereof two type and it will be seen that this construction provides for making any one of eight identifying or differently designating impressions. If two type carriers were used four different impressions could be obtained. It will be understood that in order to obtain eight separate impressions with three type carriers it will be necessary sometimes to operate only one magnet, sometimes two magnets and sometimes three magnets. An opening 55 is provided in the front of casing 112 to allow the insertion of a sales slip or other article to be marked and an extension 56 of casing 112 serves to provide a table on which the said article will rest. Although shown in Fig. 4 only a shunt is provided to the coil of solenoid 26 which shunt is controlled by the presence or absence of the said article to be marked, the insertion of such an article serving to break the shunt. It will be understood that this shunt serves to compel the insertion of an article to be marked before the stamp can be operated as the resistance of the shunt is so low compared with that of the coil of the solenoid 26 that when the shunt is closed not enough current will pass through the solenoid to operate it.

A general description of the stamping device has now been given and the circuits of the apparatus as shown in Fig. 4 will next be described. As before stated the first operation involves the use of the telephone to communicate to the credit man the name of the customer and the amount of the sale. The clerk's telephone is indicated diagrammatically at 11 and 12 in this figure. The raising of the receiver 12 serves as before stated to close contacts 17 and 18. When said contacts are closed a circuit will be made as follows; from the generator to the positive main line, wire 61, wire 62, relay coil 63, wire 64, relay coil 65, switch contact E, contact F, wire 66, telephone set, wire 67 and negative main line back to the generator. When this circuit is made relays 63 and 65 attract their armatures 68 and 69 serving to connect contacts 70 and 71, 72, and 73. Contacts 70 and 71 are in a local circuit including a battery or other generator 74, a wire 75 and a signal such as a lamp indicated at 76. This local circuit and lamp perform the function of the usual line lamp in telephone practice and serve to indicate to the credit man that communication is desired over the particular line. Contacts 72 and 73 connected by relay 65 serve to close a shunt to the main telephone circuit as follows: from the generator to the positive main line, wire 61, wire 62, coil 63, wire 64, coil 65, contact E, contact F, wire 76, contact 72, contact 73, wire 74$^a$, lamp 80, wire 81, and negative main line back to the generator. This circuit will illuminate lamp 80 and it will be seen that the lamp circuit includes the relay coil 65 and contacts 72 and 73 closed by the said relay. This relay is evidently therefore a locking relay and serves to maintain its own circiut so that even if contacts 17 and 18 of the clerk's telephone are separated the relays 63 and 65 nevertheless remain energized and lamps 76 and 80 remain illuminated until contacts E and F are separated. This is of advantage as the clerk does not need to remain at the telephone but may simply raise the hook 13 momentarily to close contacts 17 and 18 and may then proceed with other business until notified by the credit man that he is ready for communication.

When the credit man is ready to consider the particular case a main circuit closer 90 is operated in the direction indicated by the arrow X. This serves to cause an insulating roller 91 to engage contact K and force it against contact L. When this is done an alarm circuit is energized as follows; from the generator, positive main line, wire 92, relay coil 93, contact 94, contact 95, wire 96, wire 97, wire 98, contact K, contact L, wire 99, bell 100, wire 67 and negative main line back to the generator. This circuit serves to cause bell 100 to sound at the clerk's station thereby notifying the clerk that the creditman on duty is ready to communicate. It will be noted that part of this alarm circuit is provided with a shunt including a high resistance coil 101, a bell 102 and a wire 103 but this is a permanently closed shunt and has no function as far as the alarm circuit is considered. It is used in the stamping circuit, to be hereafter described. When the alarm circuit has been completed and the clerk called the main circuit controller 90 is moved away from the position closing contacts K and L in the direction of the arrow Y. When this occurs the insulating roller 91 serves to close the talking circuit which is as follows, it being noted that the insulating roller serves to part contacts E and F: from the generator, positive main line, wire 61, wire 104, wire 105, relay coil 106, wire 107, credit man's telephone set 108, wire 109, contact G, contact F, wire 66, clerk's telephone set, wire 67, and negative main line back to the generator. This circuit is of course only completed when the clerk has removed the receiver 12 from the hook 13 closing contacts 17 and 18 when the relay 106 attracts its armature 110 closing a local circuit including a lamp 111 and a generator 112, this lamp 111 performing the function of the usual supervisory lamp in telephone practice. It will be clear that communication is now to be had over the telephone circuit and the clerk may read off the customer's name and the amount of credit desired as well as any other information which the credit man may need.

It will be seen from the diagram that inductances 115 and 116 are provided in series with the telephone line and condensers 117 and 118 are also provided bridged across line. These inductances and condensers are for the purpose of eliminating undesirable noises in the telephone receiver as the system is shown for use with a direct current generator instead of a storage battery as is usual in telephone practice.

The movement of the circuit controller 90 in the direction of the arrow Y to close the telephone circuit also closes an auxiliary circuit for a warning device. It will be remembered that it was stated that the warning device for indicating to the creditman whether or not an article to be marked had been placed in the stamp was provided and this device is brought into operation when the circuit controller 90 is moved as indicated. This auxiliary circuit is energized by a low voltage battery 120 and may be traced as follows: from battery 120 to negative main line, wire 67, wire 121, coil 122 of solenoid 26, wire 127, contact D, contact C, wire 128, contact N, contact M, wire 129, relay coil 130, wire 131$^a$, back to the battery 120. In this circuit a shunt 131 around the solenoid coil 122 is provided. Relay 130 controls through its armature 132 a local circuit including contacts 133 and 134, a lamp 135 and a battery 136. When the shunt comprising wire 131 is broken all the current from the battery 120 must pass through coil 122. The resistance of this coil is very high and so lowers the amount of current in the auxiliary circuit that relay 130 is unable to attract its armature 132. If however the shunt 131 is closed the resistance of the circuit is rendered much lower and enough current will then pass through relay 130 to attract its armature 132 and thereby cause the illumination of lamp 135. It will be seen that this lamp provides an efficient warning device inasmuch as it is illuminated only when shunt 131 is closed and consequently only when no article to be marked is in the stamping device. The insertion of such an article immediately breaks the shunt 131 and lowers the auxiliary current to so great an extent that contacts 133 and 134 will open.

In many establishments it is necessary to employ more than one credit man and where more than one is so employed disputes frequently occur as to which man authorized some particular transaction. To obviate this difficulty there has been provided an identifying or designating means in the stamping device and the means for selectively controlling this may now be described. It may be noted that only two magnets 21$^a$ and 21$^b$ are shown in the diagram but this is merely to avoid complicating the same and a mere extension of the system is required to utilize three or four such magnets. At the credit station a plurality of keys 160, 161, 162, and 163 are provided one being assigned to each credit man. Adjacent to each key is a lock 164 controlled by a key 165, the bolts of the locks being adapted to engage either above or below lugs 166 on the side of each of the creditmen's keys to lock the said keys in either elevated or depressed position. Means are provided for preventing the depression of more than one key at once, such means being herein shown as a plate 167 laterally slidable and moving in one direction by the spring shown in dotted lines. This slide 167 has slots, one for each key, cut therein, said slots being differently inclined for the several keys. This construction is well known in the art and will evidently prevent the depression of more than one key at a time. If one credit key is locked in depressed position as is shown in the case of key 160 no other key can be depressed. The keys when depressed serve to close the circuits through the identifying magnets 21. It will be seen from Fig. 1 that the type carriers 49, 50 and 51 have normally one of the two types thereon at the printing point, so that if the credit man whose indication is determined by the types normally at the printing point is on duty, no movement of the type carriers need be made. Key 161 when depressed is adapted to close contacts 169 and 170, key 162 closes contacts 171 and 172 and key 163 closes contacts 173, 174 and 175. When key 161 is depressed a circuit will be completed as follows; from the generator, positive main line, wire 92, coil 93, contacts 94 and 95, wire 96, wire 97, wire 176, common wire 177, contact 169, contact 170, wire 178, contact B, contact A, wire 179, magnet 21$^a$, wire 180, wire 67, and negative main line back to the generator. If key 162 is depressed contacts 171 and 172 will be closed and a circuit made as follows; from the generator through the elements enumerated in the previous circuit to and including the common wire 177 and from thence through contacts 171, 172, wire 181, contact H, contact I, wire 182, magnet 21$^b$, wire 183, wire 67, and negative main line back to the generator. When key 163 is depressed contacts 173, 174 and 175 are closed and both magnets 21$^a$ and 21$^b$ are thereby energized as contact 174 is in parallel with contact 172 and contact 175 is in parallel with contact 170 it being noted that contact 173 like contacts 171 and 169 is connected to the common wire 177. It will be clear from the described circuit that when key 160 is depressed no motion of the identifying or designating type carriers takes place, when key 161 is used that one of the carriers is moved, when key 162 is depressed the other carrier is moved, and when key 163 is depressed both carriers are moved. This construction serves to present one of four combinations of identifying or designating type carriers at the printing point.

The stamping device is now in condition to be operated and this function is performed by the circuit closer 201. When this circuit closer is operated in the direction of the arrow Z, an insulating roller 202 carried thereby serves to withdraw contact N from contact M and connect said contact N with contact O. It will be observed that beside the identifying or designating device controlling contacts the credit keys control pairs of contacts 203 and 204, said contacts being all arranged in parallel. When therefore one of the credit keys is depressed a circuit will be made as follows; providing circuit closer 201 has been moved as above stated to close contacts N and O; from the generator, positive main line, wire 92, coil 93, contacts 94 and 95, wire 96, wire 97, wire 176, common wire 177, contacts 203 and 204, wire 205, wire 206, contact O, contact N, wire 128, contact C, contact D, wire 127, coil 122 of solenoid 26, wire 121, wire 67, and negative main line back to the generator. This circuit is traced as if shunt 131 was broken and it will of course be understood that the shunt including high resistance coil 101 and bell 102 is always in the circuit. If the article to be marked has been inserted in the stamping device and shunt 131 is thereby broken the current will pass through coil 122 of solenoid 26 and draw in the core 25 thereby forcing the platen 28 against the dating and identifying and designating type carriers and making an impression on the inserted article. If however shunt 131 is closed the resistance of the circuit is then much less than if the high resistance coil 122 was in circuit and enough current would then pass to probably damage some of the elements of the circuit except for the provision of the permanent shunt including high resistance coil 101. Normally the current passing through coils 93 and 101 is not sufficient to separate contact 95 from contact 94 thereby leaving in the circuit the low resistance line including said contacts. If however shunt 131 is closed a large current will momentarily pass through coil 93 enough in fact to attract armature 101 and break the circuit at contacts 94 and 95. The total current must then pass through the high resistance shunt including bell 102 and this both serves to reduce the current to so low a value as to offer no possibility of damage to the circuit but also serves to actuate the bell 102 thereby warning the credit man that attempt to operate the stamp should not have been made. It will be observed that even if attempt to operate the stamp is made in the absence of an article to be marked that although bell 102 is sounded as a warning the stamp is nevertheless not actuated as almost the entire current passes through the shunt 131.

From the description given it will be noted that the switch 90 controls circuits, separately including the identifying magnets, the telephone set and the stamping device, thereby causing these circuits to be opened and closed simultaneously. Through this provision, it is impossible to close the stamping circuit, without also closing an identifying circuit, so that in every case an identification of the credit operator is made at the stamp.

The complete circuits for the apparatus have now been described and it will be seen that to operate the stamp requires not only the presence of an article to be marked but also the depression of one of the identifying or designating keys. In the case of all but one of the keys the depression thereof sets up identifying or designating devices in the stamp and the equivalent of such setting up is produced in connection with the other key inasmuch as the identifying or designating type carriers each have a type normally at the printing point. The circuit for the stamp includes contacts 203 and 204 controlled by the identifying or designating keys and it is therefore necessary in all cases to depress one of the keys before the stamp may be operated. This clearly serves to identify or designate one of the credit men with each transaction authorized by him, preventing disputes and serving to fix the responsibility for all transactions.

As shown the apparatus at the credit man's station is adapted to control only one stamping device but it will be understood that in practice a plurality of stamping devices will be arranged to be operated from one central station as is usual in telephone practice. For convenience only one such clerk's station is shown.

While the form of mechanism here shown and described is admirably adapted to fulfil the requirements primarily stated, it is to be understood that it is not intended to confine the invention to the one form of embodiment herein disclosed, for it is susceptible of embodiment in various forms all coming within the scope of the claims which follow.

What is claimed is as follows.

1. In a store service system, the combination with a stamping device, including an identifying mechanism, of devices for differentially positioning said identifying mechanism, and a distant and structurally separate controlling mechanism having connections for causing actuation of said stamping device, said connections including the devices for positioning the identifying mechanism.

2. In a store service system, the combination with a stamping device including an identifying mechanism, of devices for differentially positioning said identifying mechanism, and a distant and structurally separate controlling mechanism including a circuit closer and having circuit connections for actuating said stamping device, said connections including a circuit closer actuated by the devices for differentially positioning said identifying mechanism.

3. In a store service system, the combination with a stamping device including an identifying mechanism, of distant and structurally separate devices, including adjustable elements and a manually operable key, connections between said adjustable elements and said identifying mechanism and serving to differentially position said mechanism, and connections from said manually operable key to said stamping device, said connections including circuit closing means controlled by said adjustable elements.

4. In a store service system, the combination with a stamping device including an identifying mechanism, of distant and structurally separate devices including adjustable elements and a manually operable key, circuit connections between said adjustable elements and said identifying mechanism, and serving to differentially position said mechanism, and circuit connections from said manually operable key for actuating said stamping mechanism, said circuit connections including circuit closing means controlled by said adjustable elements.

5. In a store service system, the combination with a stamping device, and adjustable identifying mechanism therein, of a circuit controller for determining the adjustment of said identifying mechanism, and a second circuit controller for operating said stamping device and rendered effective by an operation of said first controller.

6. In a store service system, the combination with a stamping device, of means rendering same normally inoperative, an identifying mechanism, means for setting said identifying mechanism and thereby preparing for operation of the stamping device, said stamp being rendered operative by the presence of an article to be marked, and means for operating said stamp dependent on the operation of the means for setting said identifying means.

7. In a store service system, the combination with a stamping device including an identifying mechanism, of a distant and structurally separate mechanism including keys, connections from said keys for actuating said identifying mechanism and said stamping device, said connections for actuating the stamping device including an element actuated by the keys which cause actuation of said identifying mechanism.

8. In a store service system, the combination with dating and identifying mechanism, of means for taking impressions from same, distant and structurally separate means for differentially setting said identifying mechanism, and distant and structurally separate means for operating said impression taking means, dependent on the setting of said identifying mechanism.

9. In a store service system, the combination with a stamping device, of differentially adjustable identifying means, means for controlling the differential adjustments of said means from a distance, and means for operating said stamping device, said means being prepared for operation by setting said controlling means.

10. In a store service system, the combination with a stamping device, and differentially adjustable identifying means, of keys controlling the differential setting of said identifying means and electrical means for operating said stamping device, said means requiring for operation the adjustment of one of said keys.

11. In a store service system, the combination with a stamping device, having operator identifying means as a part thereof, of distant and structurally separate means for controlling said stamping device, distant and structurally separate controlling devices for said identifying means, the controlling means being constructed to be ineffective until the identifying means has been set.

12. In a store service system, the combination with a stamping device having date type carriers, and identifying type carriers, of distant and structurally separate means for controlling the identifying type carriers, and means associated with said former means for operating the stamping device, said latter means including devices dependent for their operation on the means for setting the identifying carriers.

13. A store service system comprising a stamping device having means preventing its operation in the absence of an article to be marked, said stamping device including adjustable operator identifying means, distant and structurally separate devices for controlling the said identifying means, and means associated with said distant controlling devices for operating said stamping means, said last named means constructed to be ineffective until said operator identifying means has been actuated.

14. A store service system comprising a stamping device including adjustable operator identifying means, and having devices for preventing actuation of said stamping device in the absence of an article to be marked, distant and structurally separate devices for causing adjustment of said identifying means, means associated with said distant device for actuating said stamping device, and constructed to be ineffective until said identifying devices have been adjusted, and means at the distant stamp actuating devices for indicating the absence of the article to be marked.

15. A store service system comprising the combination with a stamping device, including operator identifying means and constructed to be inoperative in the absence of an article to be marked, of distant and structurally separate controlling devices having connections for differentially positioning said identifying means, means associated with said separate devices for operating said stamping device, and connections from said stamping device for indicating in proximity to said separate controlling devices, if attempt is made to operate said associated means in the absence of an article to be marked.

16. In a store service system, the combination with stamping mechanism including identifying devices, of electric connections controlling said stamping mechanism, means for completing said connections, and devices whereby the portion of said means determining the particular identifying device to be employed at an operation must be set before said electric connections can be completed to actuate the stamping mechanism.

17. A store service system comprising a stamping device including operator identifying means, keys and circuit connections therefrom for differentially setting said identifying means, and a controlling circuit including a contact means and a manually operable switch for actuating said stamping device, said contact means being constructed to be closed by said keys.

18. A store service system comprising a stamping device including operator identifying means, keys and connections for differentially setting said identifying means, a manually operable switch having connections for actuating said stamping device, and means controlled by said keys and normally preventing actuation of said stamping device by said switch.

19. In a store service system the combination with a stamping device including identifying mechanism, of means for controlling said identifying mechanism from a distance, and means for operating said stamping device, said latter means being controlled as to effectivity by the first mentioned means.

20. In a store service system, the combination with a variably operable stamping device, means distant from the stamping device for controlling the variations in operation of the stamping device, and means for operating said stamping device, said latter means being controlled by the first mentioned means.

21. In a store service system, the combination with a stamping device including identifying mechanism, of means distant from the stamping device for controlling said identifying mechanism, and means for operating said stamping device, said latter means being controlled by the first mentioned means.

22. In a store service system, the combination with a recording device, means distant from the recording device for controlling the operation of the recording device, means adjacent the recording device for variously designating records made from the recording device, and means also distant from the recording and designating means for controlling the designating means so that the latter will differently designate in conjunction with the recording means, said latter means controlling the first mentioned means.

23. In a store service system, the combination with a marking device including mechanism for differentially designating records made by the marking device, means distant from the marking device for controlling the designation to be made by the designating mechanism when the marking device is operated, and means also distant from the marking device for controlling the operation of the marking device, said latter means being controlled by the first mentioned means.

24. In a store service system, the combination with a stamping device including designating mechanism, means distant from the stamping device for controlling the designating mechanism and determining the designation to be made thereby, and means also distant from the stamping device and designating mechanism for controlling the operation of the stamping device and designating mechanism said latter means being controlled as to effectiveness by the first mentioned means.

25. In a store service system, the combination with a stamping device including adjustable designating mechanism for variously designating the records stamped by the stamping device, devices for differently positioning the designating mechanism to determine the designation to be made thereby, and a controlling mechanism distant from the controlling device having connections for causing actuation of the stamping device including the designating mechanism.

26. In a store service system, the combination with a stamping device including designating mechanism for variously designating records made by the stamping device, of devices for differentially positioning said designating mechanism, and controlling mechanism distant from the operating device including a circuit closer and having circuit connections for controlling the actuation of said stamping device, said connections including a circuit closer actuated by the devices for differentially positioning said designating mechanism.

27. In a store service system, the combination with a recording device including designating mechanism for variously designating in conjunction with the recording operations of the recording device, distant and structurally separate devices including adjustable elements and a manually operable key, connections between said adjustable elements and said designating mechanism and serving to control differential positioning of the latter, and connections from said manually operable key to the recording device, said connections including circuit closing means controlled by said adjustable elements.

28. In a store service system, the combination with a recording device including adjustable designating mechanism, distant and structurally separate devices including adjustable elements and a manually operable key, connections between said adjustable elements and said designating mechanism and serving to differentially position said mechanism, and circuit connections from said manually operable key for actuating said recording mechanism, said circuit connections including circuit closing means controlled by said adjustable elements.

29. In a store service system, the combination with a recording device and adjustable designating mechanism therein, of a circuit controller for determining the adjustment of said designating mechanism, and a second circuit controller for operating said recording device and rendered effective by an operation of said first controller.

30. In a store service system, the combination with a recording device, of means rendering the same normally inoperative, mechanism for variously designating in connection with operations of the recording device, means for setting said designating mechanism and thereby preparing for operation of the recording device, said recording device being rendered operative by the presence of an article to be marked, and means for operating the recording device depending upon the operation of the means for setting the designating means.

31. In a store service system, the combination with a recording device, designating mechanism adjacent the recording device and adjustable to selectively designate in conjunction with recording operations, and distant and structurally separate mechanism including manipulative devices for controlling the actuation of the designating mechanism and the recording device, said connections controlling actuation of the recording devices including an element actuated by the manipulative device for controlling actuation of said designating mechanism.

32. In a store service system, the combination with dating and designating mechanism, of means for taking impressions from said mechanism, distant and structurally separate means for differentially setting said designating means, and distant and structurally separate means for operating said impression taking means dependent on said designating mechanism.

33. In a store service system, the combination with a recording device, of differentially adjustable designating means, means for controlling the differential adjustment of said designating means, and means for operating said recording device, said last mentioned means being prepared for actuation by said controlling means.

34. In a store service system, the combination with a stamping device, of differentially adjustable designating means for differently designating in connection with an actuation of the stamping device, keys controlling the differential setting of the designating means, and electrical means for operating the stamping device, said means requiring for operation the adjustment of one of said keys.

35. In a store service system, the combination with a stamping device having operator designating means as a part thereof and capable of various adjustments to give various designations in connection with operation of the stamping device, of distant and structurally separate means for controlling the stamping device, and distant and structurally separate controlling devices for said designating device said distant controlling means constructed to be ineffective until the designating means has been set.

36. In a store service system, the combination with a stamping device having date type characters and designating type carriers for variously designating in conjunction with impressions taken from the stamping device, distant and structurally separate means for controlling said designating type carriers, and means associated with said former means for operating the stamping device, said latter means including devices dependent for their operation on the means for setting the designating type carriers.

37. In a store service system, comprising a recording device having means preventing its operation in the absence of an article to be recorded upon said recording device including an adjustable operator designating means, distant and structurally separate devices for selecting the designating means to be operated in conjunction with the operation of the stamping device, and means associated with the distant devices for controlling the operation of the recording device, said last means constructed to be ineffective until said operator designating means has been selected.

38. In a store service system comprising a stamping device including adjustable operator designating means and having devices for preventing actuation of said stamping device in the absence of an article to be marked, distant and structurally separate devices for causing adjustment of said designating means, means associated with said distant device for controlling the actuation of said stamping devices and constructed to be ineffective to cause operation of said stamping device until said designating devices have been adjusted, and means at the distant controlling means for indicating the absence of the article to be marked at the stamping device.

39. In a store service system comprising the combination with a recording device including operator identifying means and constructed to be ineffective in the absence of an article to be marked, a distant and structurally separate controlling device having connections for differentially positioning said means, means associated with said distant device for controlling the operation of the recording device, and connections from said recording device for indicating in proximity to said distant controlling devices if an attempt is made to operate said associated means in the absence of an article to be marked.

40. In a store service system, the combination with recording mechanism including designating devices for variously designating in conjunction with operations of the recording mechanism, electric connections controlling said recording mechanism, means for completing said connections, and devices whereby the portion of said means determining the particular designating device to be employed at an operation must be set before said electric connections may be completed to actuate the recording mechanism.

41. In a store service system, comprising a recording device including operator designating means, keys and circuit connections therefor for differentially setting said designating means, and a controlling circuit including a contact means and a manually operable switch for actuating said recording device, said contact means being constructed to be closed by said keys.

42. In a store service system comprising a recording device including operator designating means, keys and connections for differentially setting the designating means, a manually operable switch having connections for actuating the recording device, and means controlled by the keys normally preventing actuation of the recording device by said switch.

43. In a store service system, the combination with a stamping device including a variable identifying stamping surface, of means distant from the stamping device for controlling the variations of said identifying surface, and means for operating said stamping device said latter means being controlled by the first mentioned means.

44. In a store service system, the combination of a stamping device, means having a variable identifying surface for variably designating in conjunction with impressions taken from the stamping device, means distant from the stamping device and the first mentioned means for controlling the variations of the surface of the first mentioned means, and means for operating the stamping device and the first mentioned means, said operating means being controlled by the controlling means.

45. In a store service system, the combination with a marking device including identifying mechanism, of means for controlling said identifying mechanism from a distance, and means for operating such marking devices.

46. In a store service system, the combination with a marking device comprising identifying mechanism having a plurality of identifying characters, of means for selectively controlling said identifying mechanism, and means for effecting a marking from the identifying mechanism.

In testimony whereof I affix my signature in the presence of two witnesses.

CHARLES F. KETTERING.

Witnesses:
 Roy C. Glass,
 Carl W. Beust.